2 Sheets—Sheet 1.

R. MARQUIS.
Ear Corn Elevator Feeder.

No. 201,543. Patented March 19, 1878.

WITNESSES

INVENTOR
R. Marquis

ATTORNEYS

2 Sheets—Sheet 2.

R. MARQUIS.
Ear Corn Elevator Feeder.

No. 201,543. Patented March 19, 1878.

WITNESSES
Francis L. Durand
H. Aubrey Toulmin

INVENTOR
R. Marquis,
Alexander Mason
ATTORNEYS

UNITED STATES PATENT OFFICE.

ROBERT MARQUIS, OF KOKOMO, INDIANA.

IMPROVEMENT IN EAR-CORN-ELEVATOR FEEDERS.

Specification forming part of Letters Patent No. 201,543, dated March 19, 1878; application filed February 26, 1878.

*To all whom it may concern:*

Be it known that I, R. MARQUIS, of Kokomo, in the county of Howard, and in the State of Indiana, have invented certain new and useful Improvements in Ear-Corn-Elevator Feeders; and do hereby declare that the following is a full, clear, and exact description thereof, reference being had to the accompanying drawings, and to the letters of reference marked thereon, making a part of this specification.

The nature of my invention consists in the construction and arrangement of a mechanism for feeding ear-corn to elevators, as will be hereinafter more fully set forth.

In order to enable others skilled in the art to which my invention appertains to make and use the same, I will now proceed to describe its construction and operation, referring to the annexed drawings, in which—

Figure 1:
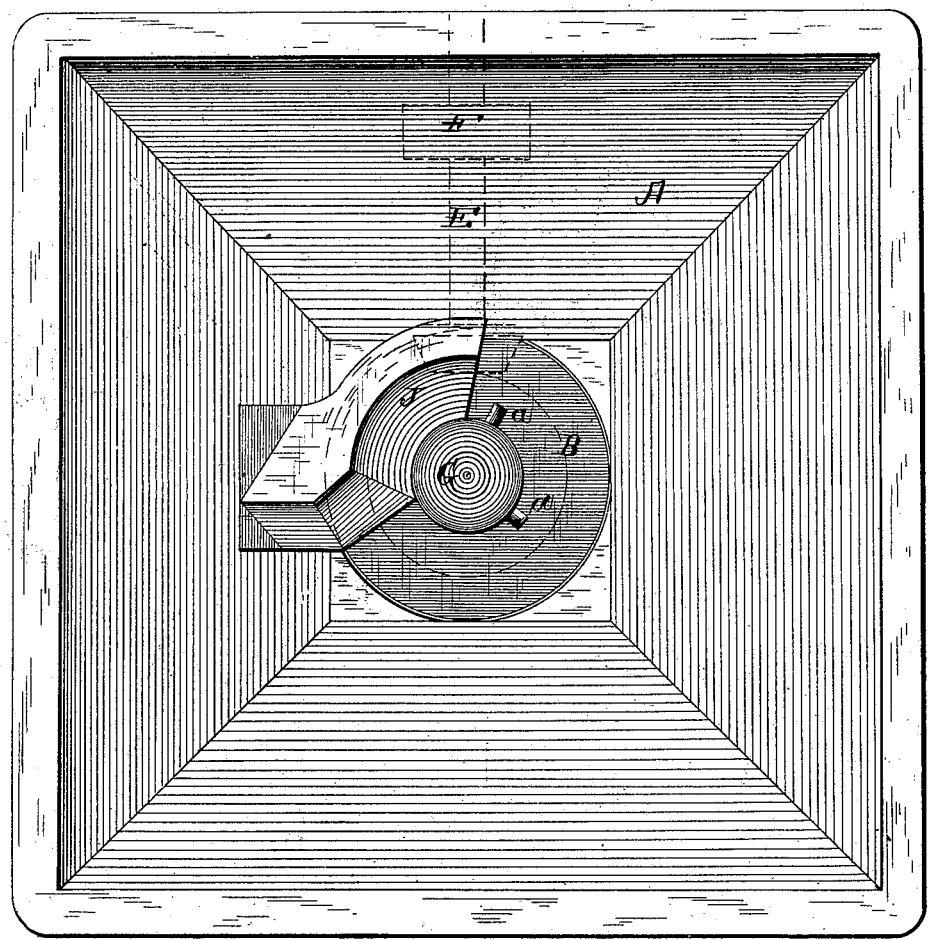
Figure 2:
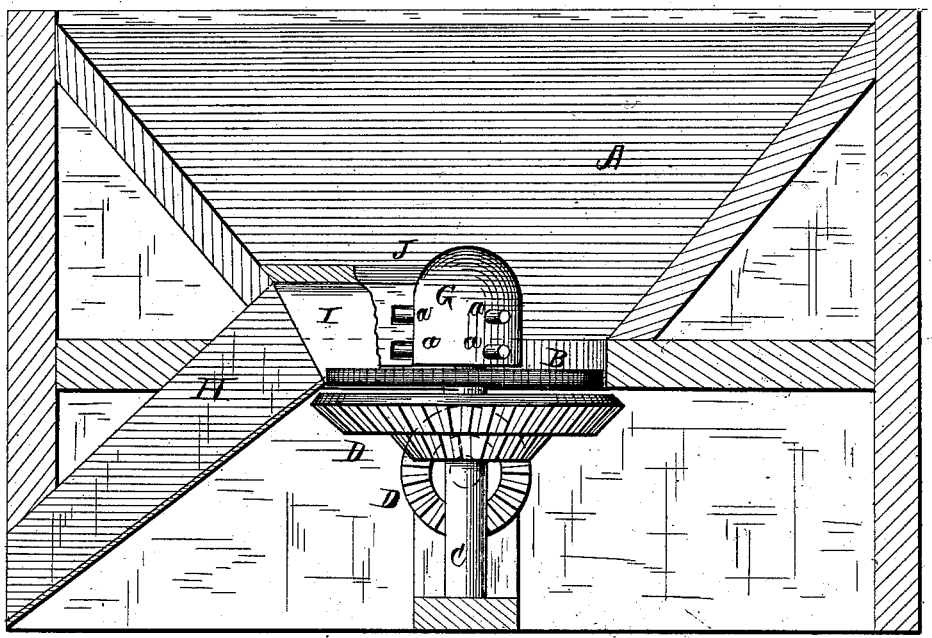

Figure 1 is a plan view, and Fig. 2 a vertical section, of my invention.

A represents a hopper of any suitable dimensions, upon the bottom of which is a circular revolving plate, B, secured upon the upper end of a vertical shaft, C. This shaft receives its motion by means of gear-wheels D D from a horizontal shaft, E, provided with a band-pulley, F, or in any other suitable or convenient manner. On the plate is a central dome-shaped drum or cylinder, G, provided with teeth $a\ a$, projecting radially from the same.

H is the chute leading from one side of the hopper at the bottom to the elevator. I is the discharge-board, and J is a shield or covering leading partially around the cylinder G to the mouth of the chute H.

The corn is dumped into the hopper A upon the plate B and cylinder G, which, revolving, carries the corn into the mouth of the shield or covering J. The teeth $a$ on the cylinder prevent the corn from lodging. The discharge-board I then throws the corn into the chute H, which carries it to the elevators.

Having thus fully described my invention, what I claim as new, and desire to secure by Letters Patent, is—

The combination, with the hopper A, of the revolving plate B, revolving toothed cylinder G, shield J, discharge-board I, and chute H, substantially as and for the purposes herein set forth.

In testimony that I claim the foregoing I have hereunto set my hand this 2d day of February, 1878.

ROBERT MARQUIS.

Witnesses:
H. AUBREY TOULMIN,
J. N. LOOP.